Nov. 5, 1929.　　　F. E. McCABE　　　1,734,174
MOLDING SYSTEM
Filed Sept. 19, 1925　　11 Sheets-Sheet 9
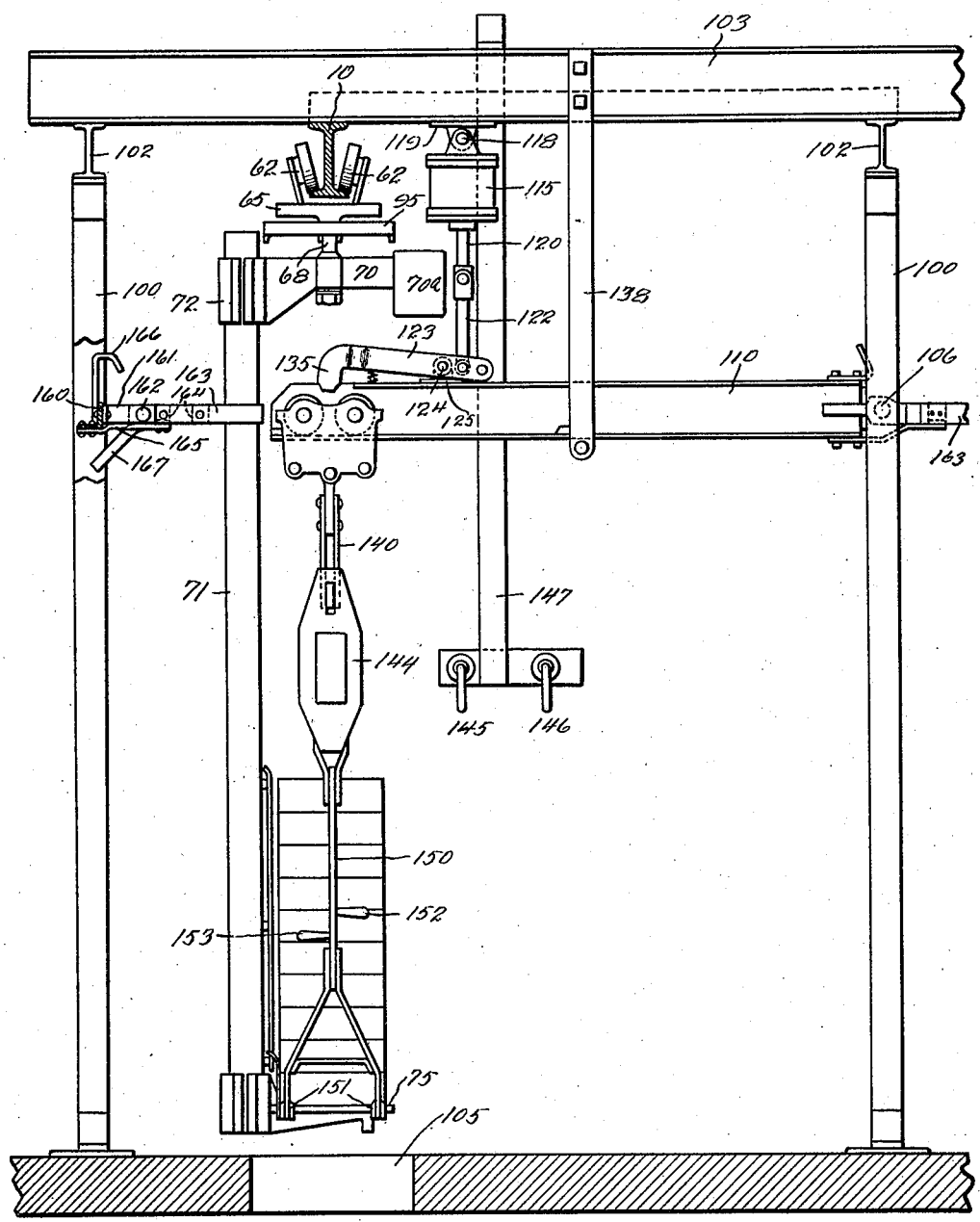
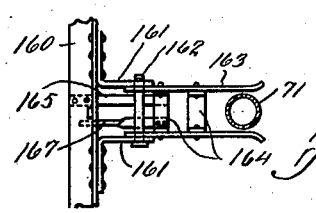
Fig.13
Fig.14
Inventor
Frank E. McCabe
By Hull, Brock & West
Attys.

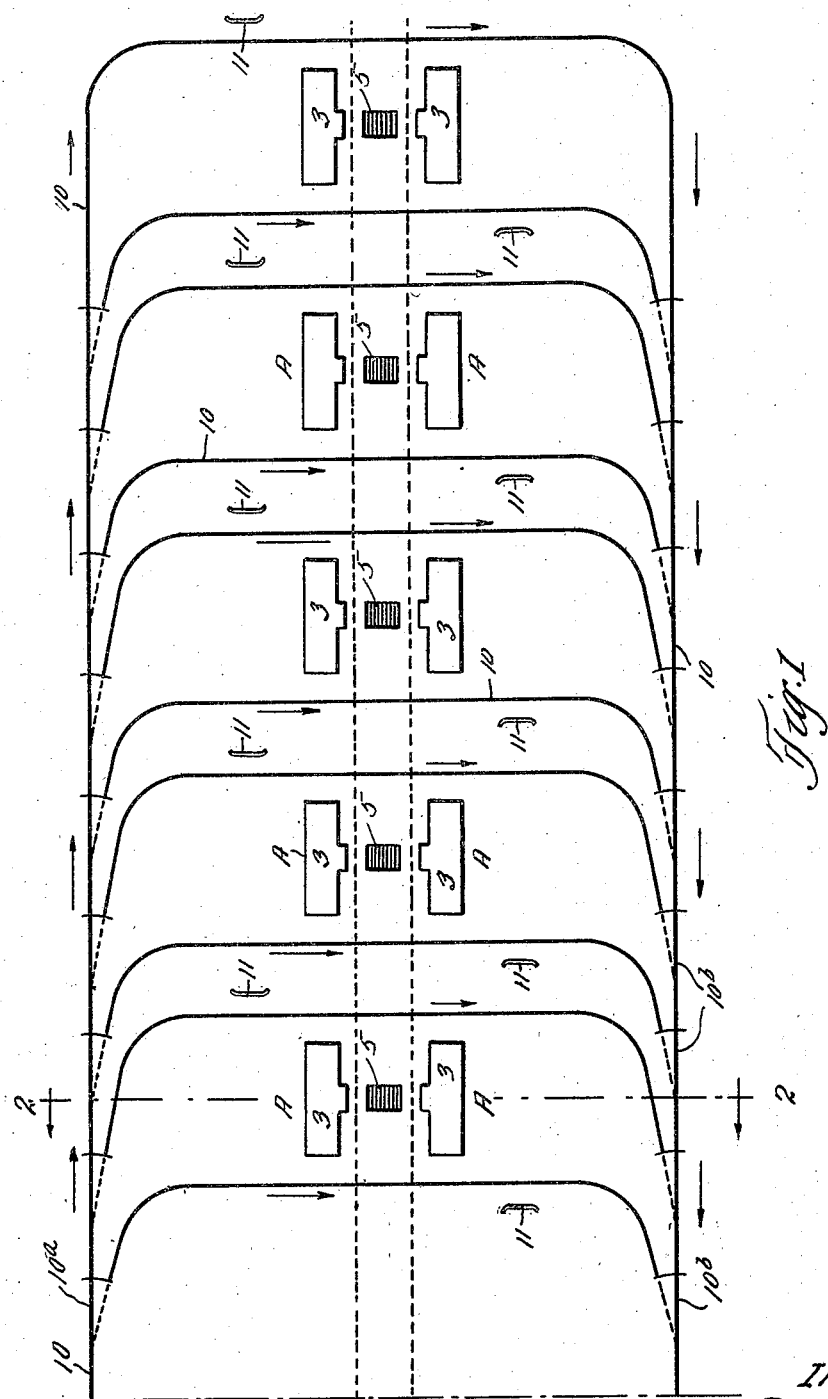

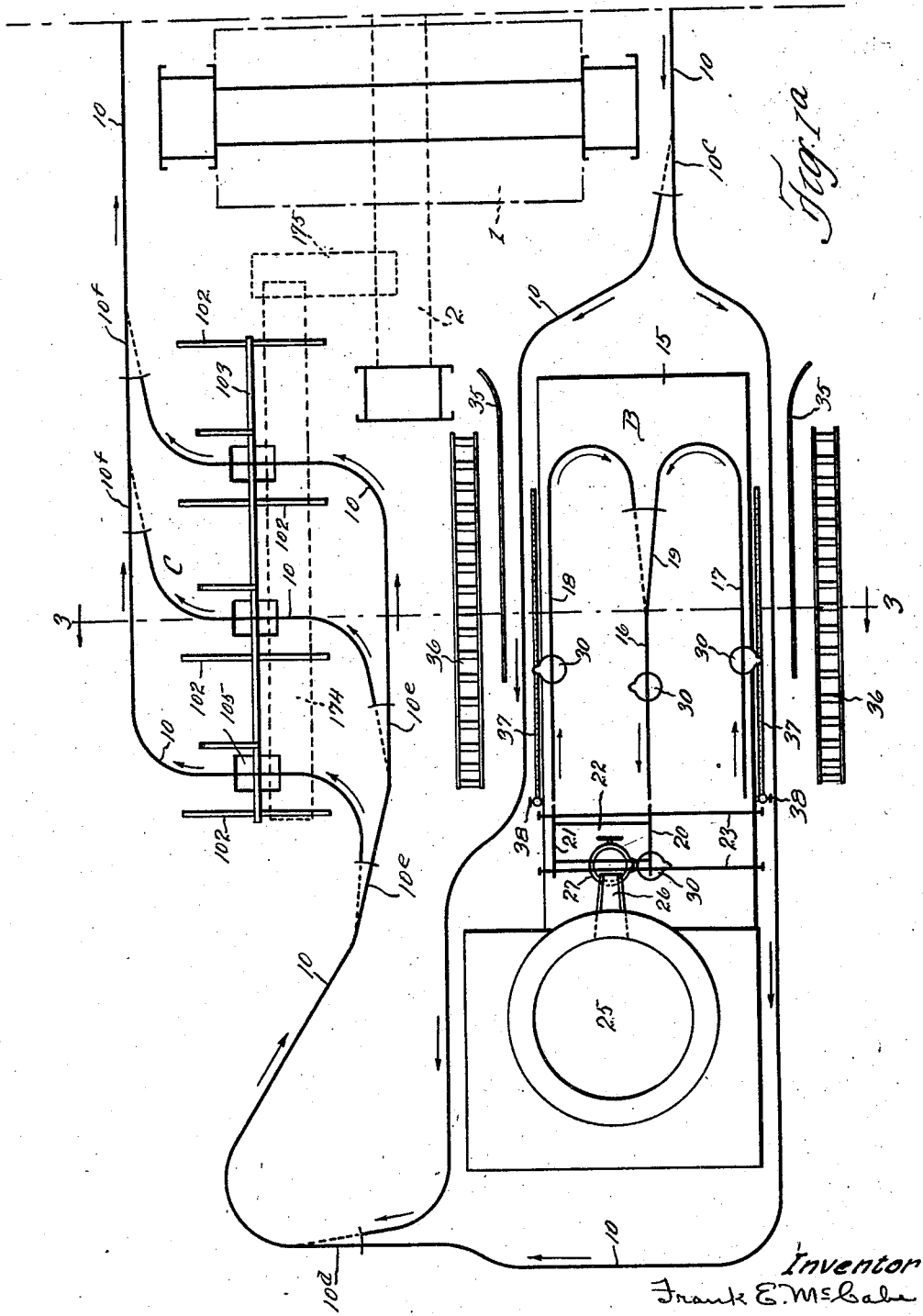

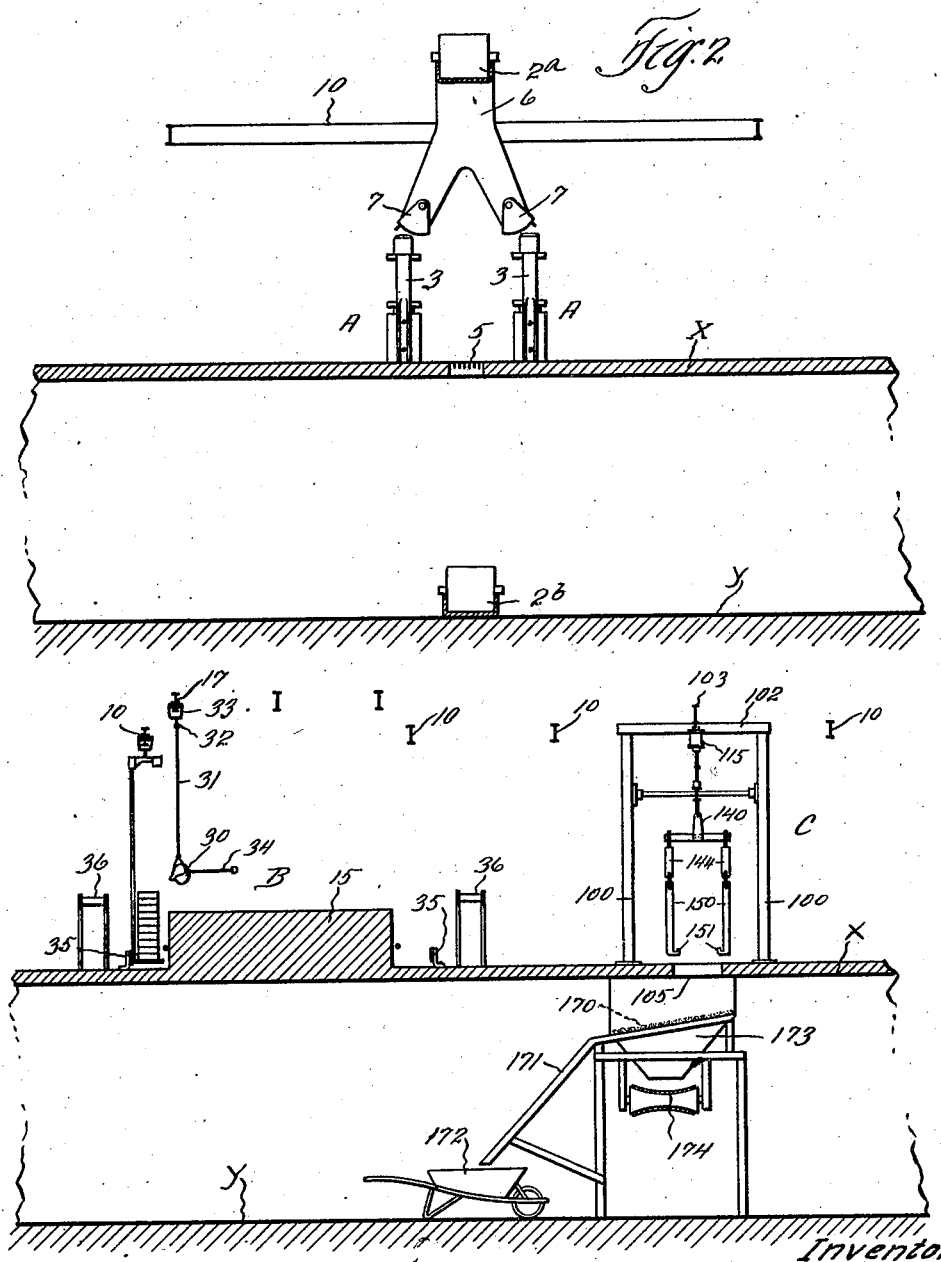

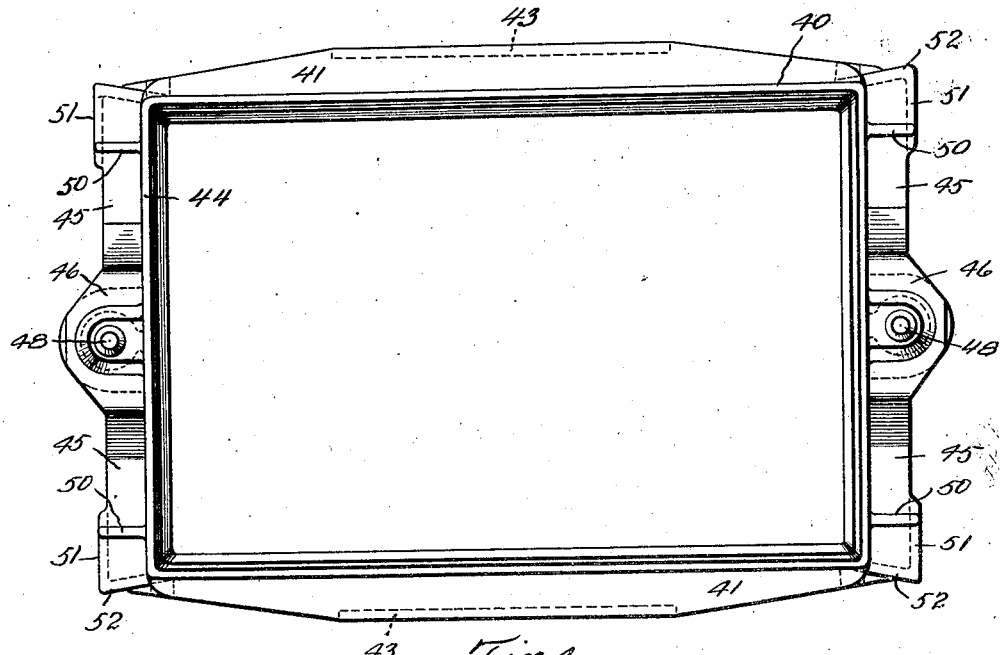
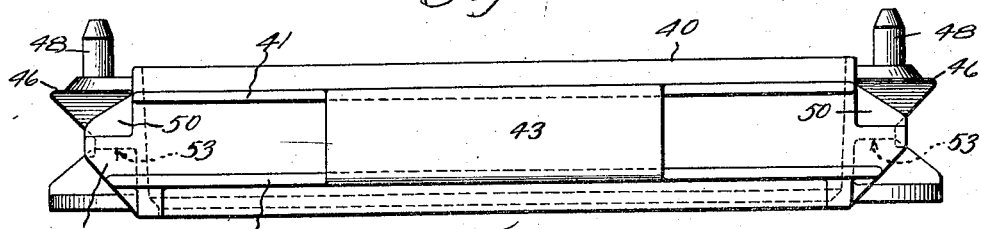
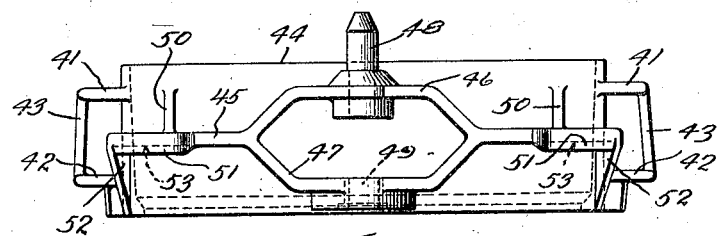

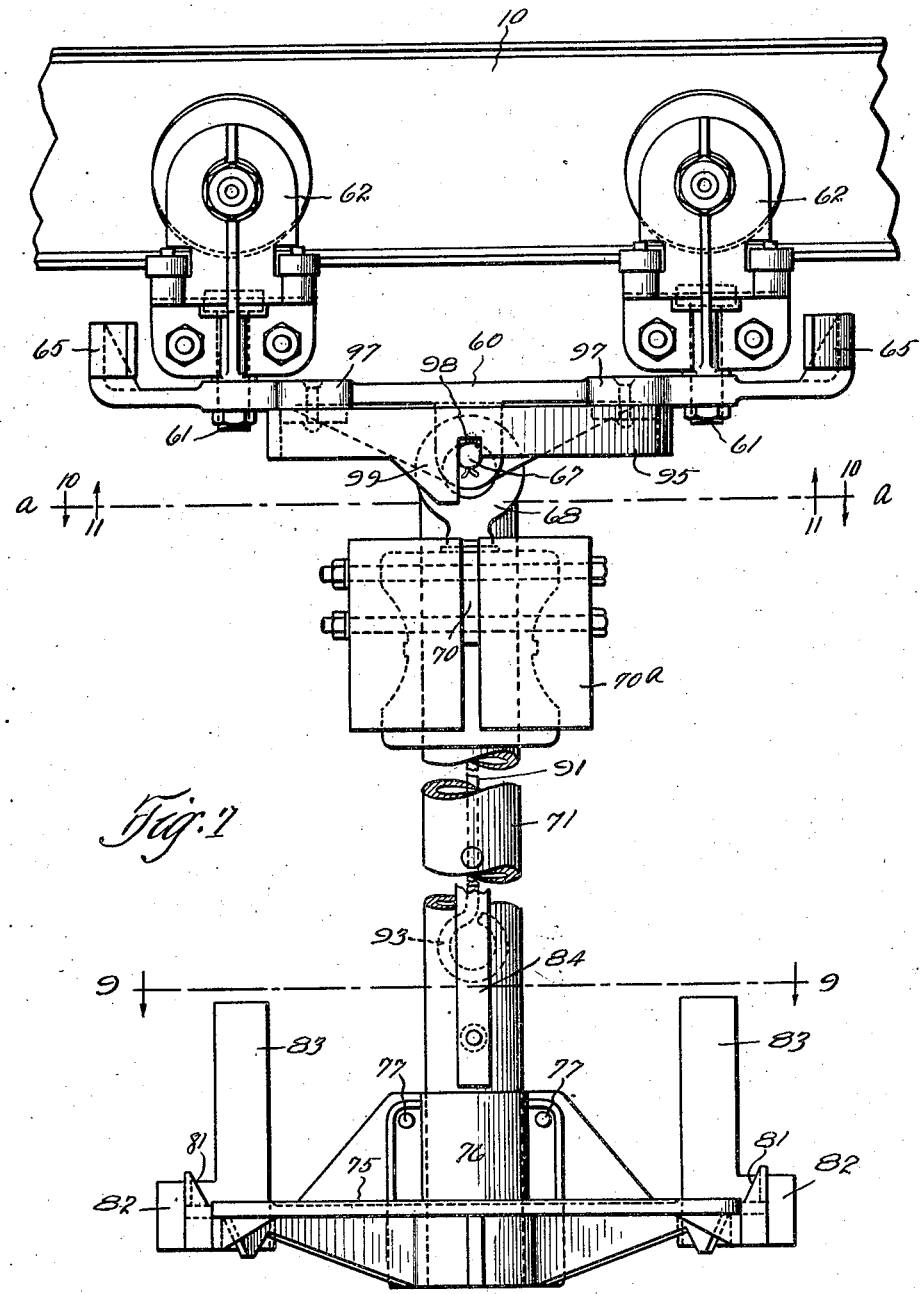

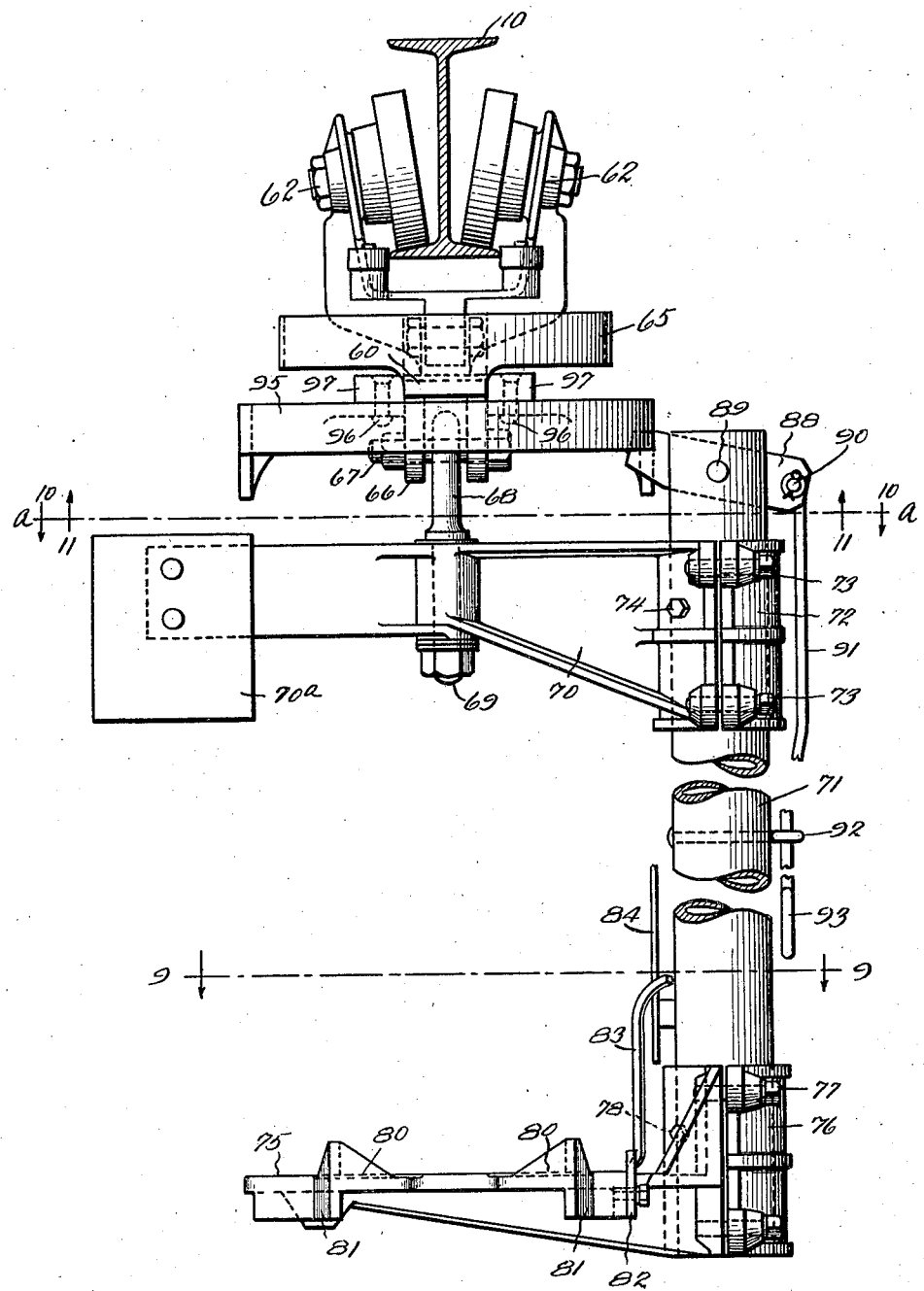

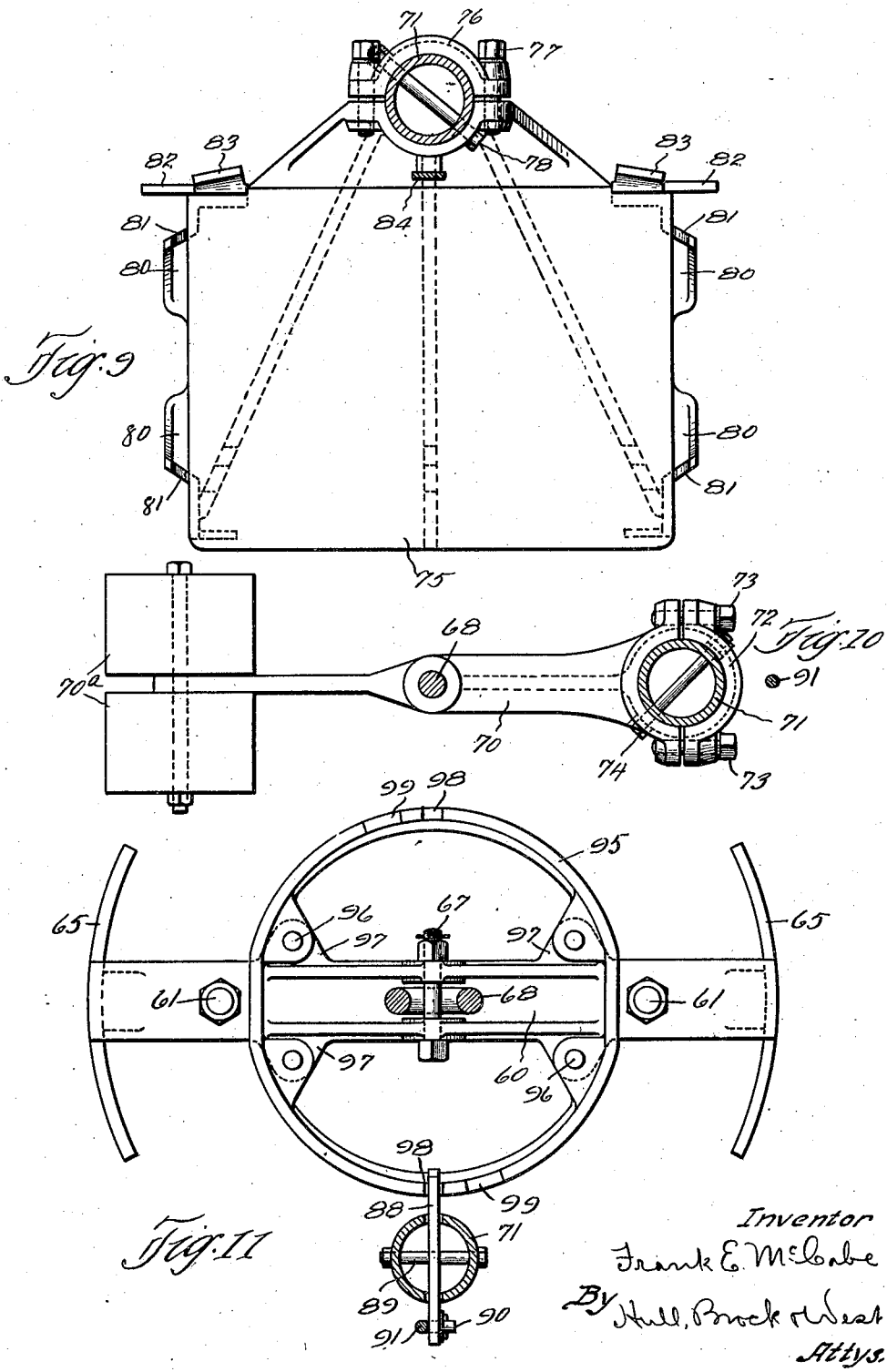

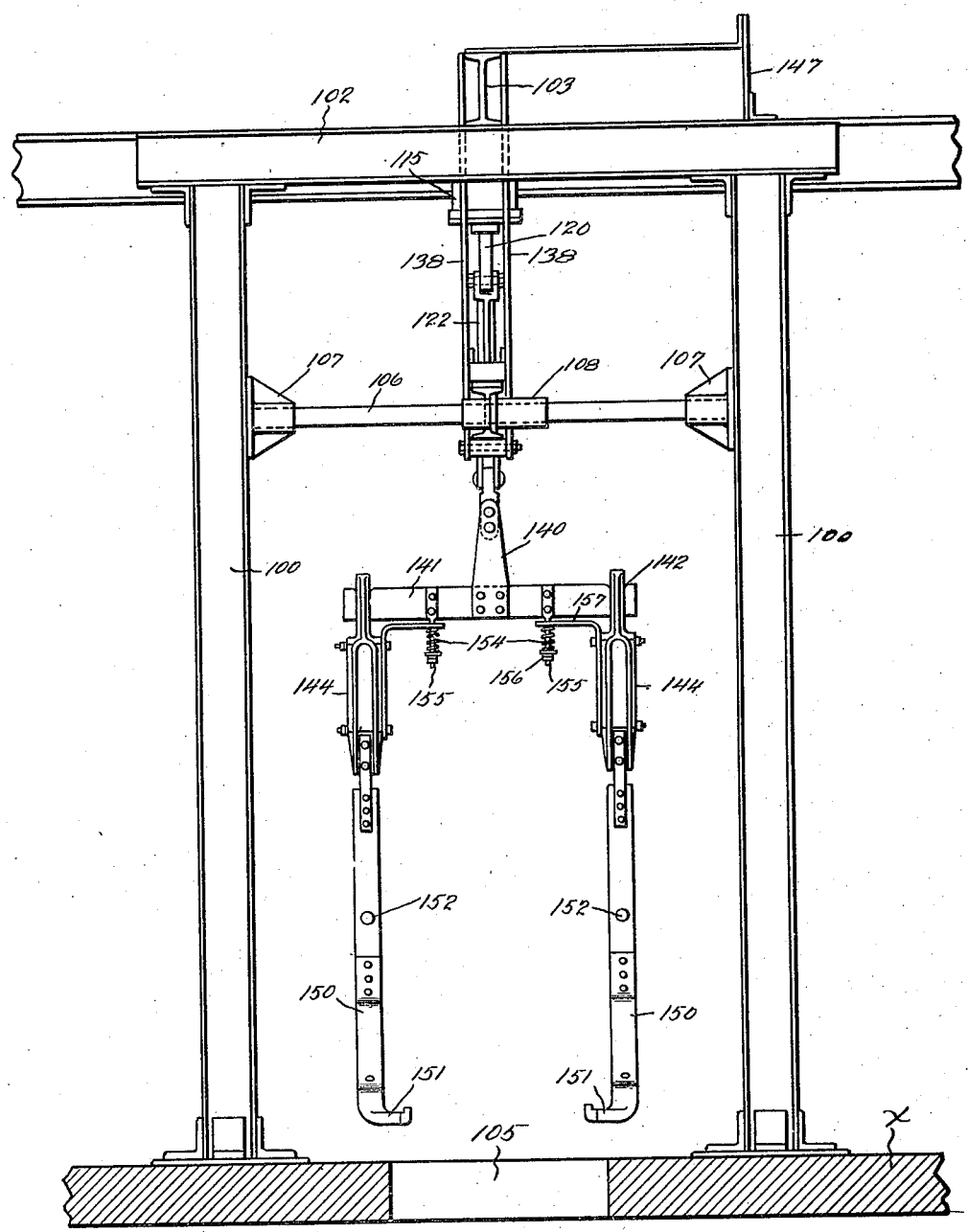

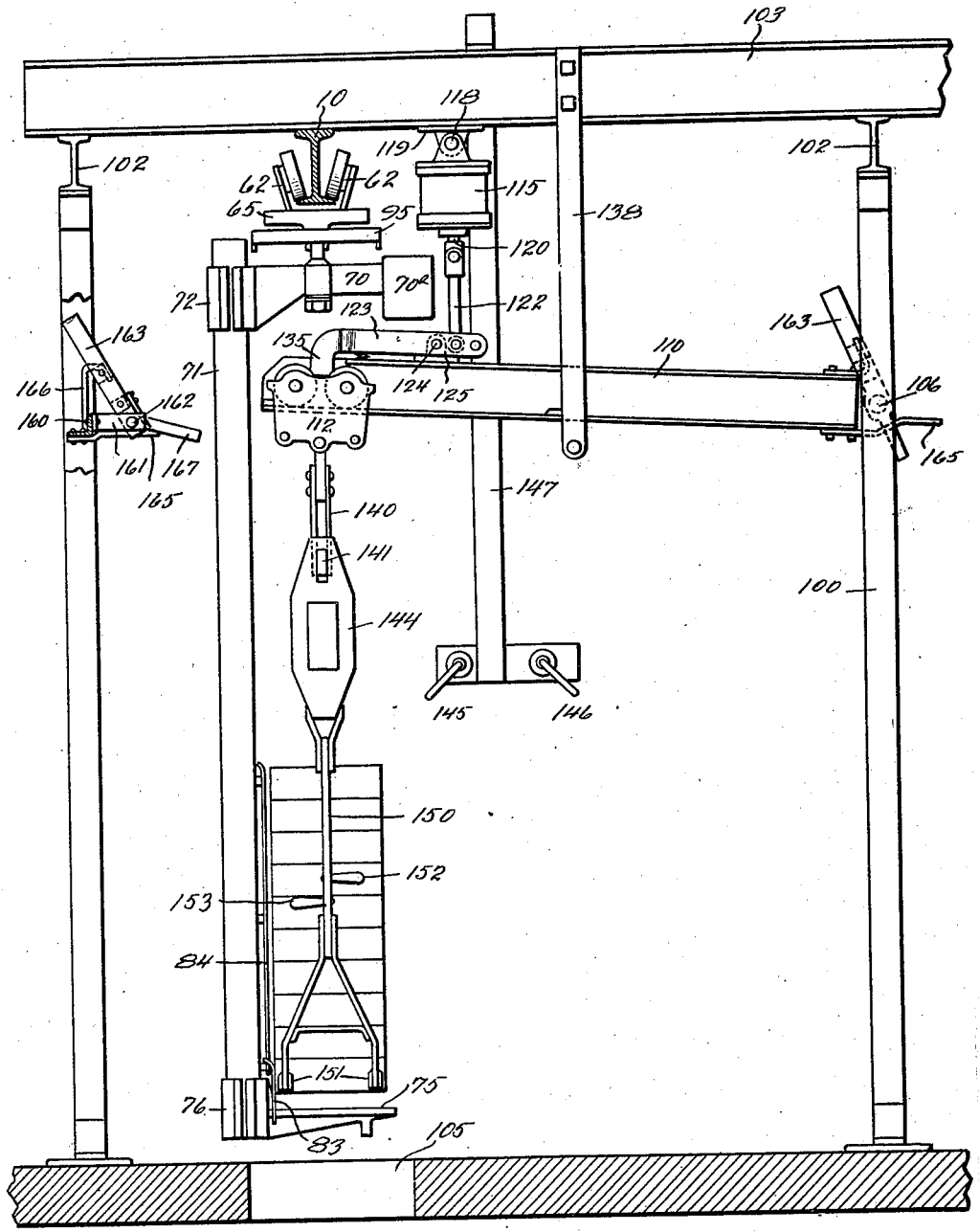

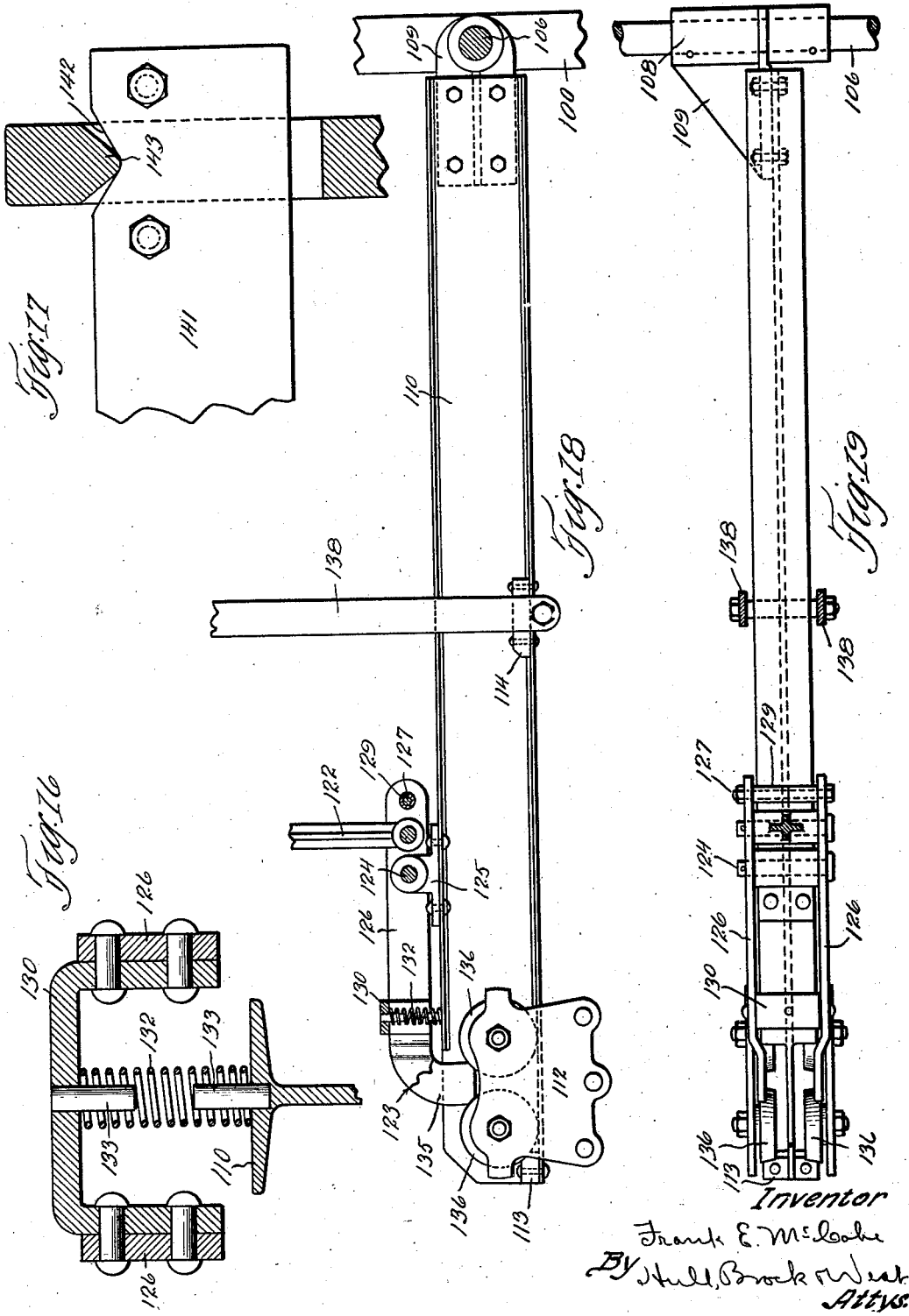

Patented Nov. 5, 1929

1,734,174

UNITED STATES PATENT OFFICE

FRANK E. McCABE, OF CHAGRIN FALLS, OHIO, ASSIGNOR TO THE GRABLER MANUFACTURING COMPANY, OF CLEVELAND, OHIO, A CORPORATION OF OHIO

MOLDING SYSTEM

Application filed September 19, 1925. Serial No. 57,333.

This invention relates to the art of molding, and its purpose, generally speaking, is to provide a system by which the several steps in the process of molding are so timed and coordinated and rendered so nearly automatic that a great saving of time is effected, and unskilled labor may be employed for work heretofore requiring highly experienced men, all of which results in increased production at lower cost. Also, castings of uniformly high quality are assured, and working conditions are greatly improved.

Other and more specific objects of the invention are to provide a mold carrier for use in a system of the aforesaid character that is especially convenient of handling, and by means of which a stack of molds may be easily transported through the various stations of the molding system; to provide in a system of the foregoing nature a unique arrangement of portable ladles by which the pouring of the molds is expedited and greatly facilitated; to provide means for burning the gases generated within and expelled from the molds during, or immediately subsequent to, the pouring operation, thus destroying injurious gases in the presence of which the workmen would otherwise have to work, and preventing the gases from accumulating and possibly exploding and damaging the molds; to provide a shake-out apparatus by means of which a stack of molds may be readily lifted from the carrier and jarred so as to remove the sand and castings from the flasks, and by means of which the empty flasks may, with equal ease, be replaced upon the carrier in correct position for their return to the molding stations; to provide means for separating the casting from the sand and returning the sand to sand re-conditioning apparatus; and to provide an arrangement of conveyors for distributing the re-conditioned sand to the various molding stations of the system.

Further purposes and objects, with advantages accuring therefrom, will appear as I proceed to describe the invention by reference to the accompanying drawings wherein Figs. 1 and 1ª represent, diagrammatically, a plan view of the system; Figs. 2 and 3 are views of a similar character representing sections on the respective lines 2—2 of Fig. 1 and 3—3 of Fig. 1ª; Figs. 4, 5 and 6 are a plan view, side elevation, and end elevation, respectively, of a mold flask used in the system; Fig. 7 is a front elevation, and Fig. 8, a side elevation, of the mold carrier; Fig. 9 is a sectional plan taken on the line 9—9 of each of Figs. 7 and 8; Figs. 10 and 11 are sectional details of the mold carrier on the line a—a of each of Figs. 7 and 8, the former view being taken as though looking in the direction of the arrows 10, and the latter, as though looking in the direction of arrows 11; Fig. 12 is a front elevation of the shake-out apparatus; Fig. 13 is a side elevation of the same, in position to lift a stack of molds from a carrier; Fig. 14 is a detail of means for positioning and holding the carrier while the molds are being transferred to or from the shake-out apparatus; Fig. 15 is a view, similar to Fig. 13, showing the shake-out apparatus sustaining a stack of molds as in a position to jar the sand and castings therefrom; and Figs. 16 to 19 are details, on an enlarged scale, of the shake-out apparatus.

In brief, the system consists of one or more mold making or forming stations; a pouring station; and a shake-out station; suitable sand re-conditioning apparatus; an arrangement of conveyors for carrying sand from the re-conditioning apparatus to the mold forming station or stations, returning the excess sand from such station or stations to the re-conditioning apparatus, and for returning to said apparatus the sand which is discharged from the flasks at the shake-out station; and mold carriers which travel successively past the mold forming station or stations, the pouring station, and the shake-out station.

In Figs. 1 and 2, the mold forming stations are designated A; in Figs. 1ª and 3, the pouring station is designated B, and the shake-out station is designated C. Sand re-conditioning apparatus in indicated at 1, in Fig. 1ª, and by means of an endless conveyor 2, sand is carried from said apparatus to the various mold forming stations. The upper reach or branch of the conveyor is designated 2ª in Fig. 2 and extends over an isle that separates two batteries of oppositely facing molding machines 3 by means of which the sand may be properly compressed within the flasks, with mold cavities formed on top and bottom by patterns that are carried, respectively, by the two relatively movable members of the molding machine. A machine that is especially well adapted to this system is disclosed in my co-pending application Serial No. 733,364, filed August 1, 1924. As shown, at intervals along the course of the conveyor 2, two molding machines are arranged back to back on opposite sides of the beforementioned isle above which the branch 2ª of the conveyor travels, and an opening 5 is made in the floor X on which the molding machines stand, between said machines, the same being protected by a suitable grid. Above each group of molding machines the branch 2ª of the conveyor 2 discharges into a chute 6 that is forked at its lower end for the purpose of distributing sand dropped from the conveyor to the two molding machines. The discharge of sand from each fork of the chute is controlled by a shutter 7. Excess sand from said machines is adapted to be dropped through the corresponding opening 5 onto the lower reach or branch 2ᵇ of the conveyor 2 which is located on a sub-floor Y.

Extending past the molding stations A, the pouring station B, and the shake-out station C is an overhead track which (with its several branches) is designated 10. This track is of standard I-beam construction, and mold carriers, which will presently be described in detail, are suspended from the track and are adapted to be moved along the same in the direction indicated by the arrows. Switches 10ª connect the section of track which extends along the upper sides of Figs. 1 and 1ª, and which represents the starting point of the system, with transverse branches that pass the molding stations A, and said transverse branches connect with the section extending along the lower side of Fig. 1, through switches 10ᵇ. The track, as it approaches the pouring station B, is separated into two branches which pass on opposite sides of said station and which are adapted to be connected at will with the section from which they divide, through a switch 10ᶜ. The last mentioned branches come together again beyond the pouring station and connect, through a switch 10ᵈ, with a section which, through switches 10ᵉ, is adapted to be thrown into continuity with branches extending through the shake-out station C. As shown, there are three discharge points in the shake-out station, it being necessary, of course, to provide a shake-out station having a capacity that will take care of the molds supplied by the battery of molding machines and equal to the maximum capacity of the pouring station. The branches of the track extending through the shake-out station are joined, through switches 10ᶠ, with the first mentioned section of the track.

At each molding station A, and offset slightly from the vertical plane of the branch of track 10 which conveys the mold carriers to and from said station, is what may be termed a back-stop 11, the purpose of which will presently appear.

At the pouring station there is a platform 15 of suitable height (see Figs. 1ª and 3), and suitably supported above the platform are tracks 16, 17 and 18, the track 16 being midway between tracks 17 and 18. Track 16 is adapted to be connected with the return curved ends of tracks 17 and 18 through a switch 19. The opposite ends of the tracks terminate in a common plane, and adapted to be brought into register, alternately, with tracks 16 and 17, and with tracks 16 and 18, are track sections 20 and 21 that are suspended from a shuttle truck 22 which traverses rails 23 extending transversely of the platform 15 a suitable distance thereabove.

Situated beyond the end of the platform 15 adjacent the transverse track 23 is a cupola furnace 25 that is arranged to discharge, through a spout 26, into a master ladle 27 that is suitably supported below said spout and is adapted to be tilted at will by mechanism (not shown). The purpose of the master ladle 27 is to transfer the molten metal from the furnace to a number of pouring ladles 30 that are suspended from trolleys that traverse the tracks 16, 17 and 18 and are adapted to be run from the branch 16, onto either of the track sections 20 and 21 of the shuttle truck 22, and from said track sections, to tracks 17 and 18. In Fig. 3, the means for suspending one of the ladles 30 is shown conventionally as consisting of a link 31 which is attached to the bail of the ladle and has swivel connection at 32 with a trolley 33 that is mounted on the track 17. The ladle is provided with a handle 34 by means of which it may be moved along the tracks and tilted during the pouring operation.

Along each side of the platform 15 is a back stop 35, and beyond each back stop is a conveyor 36. The purpose of these backstops and conveyors will presently be described. Extending some distance along each side of the platform 15 are gas burners 37 that are shown as controlled by valves 38. These burners are kept lighted during operation of the system to ignite any gas that is generated in and expelled from the molds for the two-fold purpose of destroying the injurious gas and preventing it from accumulating and exploding with damaging results to the molds. By this means the gas is burned as rapidly as it is expelled from the molds.

The flask

A flask designed for use in the system is illustrated in Figs. 4, 5 and 6. It comprises a rectangular frame 40 which is stiffened along each side by top and bottom flanges 41 and 42 that are connected together intermediate their ends by a web 43. This effects a sort of tubular formation for the longer sides of the flask which, while being light, is very strong. The importance of keeping the flasks as light as practicable will be more fully appreciated when it is explained that the flasks have to be handled manually at the mold forming stations, and that a stack of several flasks is sustained by each of the traveling mold carriers. The end walls 44 are strengthened by transverse flanges 45 which divide at their centers into top and bottom branches 46 and 47, respectively, the former being provided with dowels 48 and the latter with bushed openings 49 which are arranged to receive the dowels of the flask therebelow when the flasks are stacked one upon another. Near its ends, each flange 45 is reinforced or braced by brackets 50, and on its lower side the ends are skirted by depending beads 51. Walls 52 which extend downwardly from the ends of the flange 45 converge inwardly for a purpose which will presently appear. The undersides of the ends of flanges 45, where they are partially surrounded by the beads 51 and wall 52, may be referred to as sockets 53.

The mold carrier

As previously stated, mold carriers traverse the track 10. One of the carriers is illustrated in detail in Figs. 7 to 11, and it is comprised of a beam 60 that is suspended, through swivel bolts 61, from trolleys 62 that ride upon the bottom flanges of the I-beams whereof the track 10 is composed. These trolleys are of standard construction and swing easily with respect to the beam 60 so that in negotiating curves and passing through switches, no difficulty is experienced. At its opposite ends, the beam 60 is formed with bumpers 65 which limit the distance within which one carrier may approach another. Supported by and between ears 66 that depend from the middle portion of the beam 60 is a bolt 67 that is engaged through the eye 68 of a king bolt 69 on which is swiveled a head 70 of the mold carrier. Counterbalancing weights 70$^a$ are applied to one end of the head 70, while the opposite end of the head is formed for application to a tubular column 71, the column being clamped between the head and a cap 72 that is applied thereto and secured in place by screws 73. The parts are relatively positioned by a bolt 74 which passes through registering apertures in the head, column and cap.

Similarly connected to the lower portion of the column 71 is a mold or flask support 75, the cap, screws and positioning bolts associated with said support being designated, respectively, by the reference numerals 76, 77 and 78. The support 75 is in the nature of a flat shelf, and at its ends has guides 80 for properly positioning the flask upon the support, the corners of the flask frame engaging within the angles of said guides. It will be observed from Fig. 8 that walls 81 of said guides depend a material distance below the top plane of the support, and that spaced from the walls 81 adjacent the rear side of the support, are stop lugs 82 which extend beyond and are substantially in line with the rear edge of the support. Rising from the rear corners of the support are guides 83 which have their upper ends curved rearwardly, said guides assisting in properly positioning the flask with respect to the support as it is lowered thereon. A guide strip 84 is applied to the front side of the column 71 and extends from a point somewhat below the upper ends of the guides 83 to an elevation equal to or somewhat above the level of the topmost flask of the stack that is adapted to be supported by the mold carrier. This will be seen by reference to Figs. 13 and 15.

For a reason which will presently appear, it is necessary at times to turn the mold sustaining portions of the carriers on the king bolts 69 through substantially 180°, and latch mechanism which I shall now describe is employed for properly locating the said portions of the carriers in their two extreme positions and for holding them in such positions during certain operations. Above the head 70 of each carrier, the column 71 is provided with a kerf, and a latch bar 88 is pivotally supported within the kerf upon a pin 89. To the outer end of the latch bar is articulated, as at 90, the upper end of a latch rod 91 which is guided near its lower end through an eye 92, carried by the column. The rod terminates at its lower end in a ring or handle 93 by means of which the rod may be elevated. The weight of the rod normally maintains the latch bar 88 in the position shown in Fig. 8. The inner end of the latch bar cooperates with a latch ring or element 95 that is shown secured, as by rivets 96, to ears 97 that are formed on the beam 60. At diametrically opposite points the latch ring is provided with notches 98 for the reception of the inner end of the latch bar; and to facilitate the register of the latch bar with the notches, the ring is provided with lugs 99 that are engaged by the bar when the same is in line with the notches. These stop lugs limit the rotation of the suspended structure precisely to a movement of 180°, and the operator is thus relieved of having to pay any attention to the positioning of the parts.

Shake-out apparatus

I shall next describe the shake-out apparatus illustrated more or less conventionally in Figs. 1ª and 3, and in detail in Figs. 12 to 19, and which is installed in multiple at station C. By reference to Figs. 1ª and 3 it will be observed that, at station C, there is a structural frame work comprised of posts 100 that are connected together at their upper ends by transverse members 102 which, in turn, are tied together by a longitudinal member 103. These members may be identified by the same reference characters in Figs. 12 to 15. For the purpose of illustration I have elected to show on an enlarged scale in Figs. 12 to 15, the left hand unit or apparatus of station C as the same is viewed in Fig. 1ª, although all the units of the station are identical with but one exception which will presently be noted. Three branches of the track 10 cut through the shake-out station and it may be explained that the rails of the track at this location are supported from the longitudinal member 103. In the floor 6, directly below the points where the branches of the track 10 cross the member 103, are openings 105 through which the sand and castings are adapted to be precipitated to separating means below.

Supported by and between each pair of posts 100, a suitable distance below the corresponding cross member 102 (excepting between those occurring at the extreme left hand end of station C, as viewed in Fig. 1ª) are shafts 106. These shafts have their ends journaled in socket members 107 that are applied to the posts, and at about their longitudinal centers have secured to them the hub portions 108 of fulcrum brackets 109 (see Figs. 12, 18 and 19). Secured to each bracket 109 is a rail 110 which is shown as in the nature of an I-beam, and adapted to travel along the outer end portion of the rail is a trolley 112. The movement of the trolley is arrested in an outward direction by a stop 113 and in an inward direction by a stop 114. Each of the rails 110 is adapted to be swung through a limited movement on the axis of its shaft 106 by means of a fluid pressure motor 115. This motor is preferably comprised of a cylinder and piston, the cylinder being pivotally connected at 118 to a bearing 119 that is carried by the member 103, while the rod 120 of the piston (not shown) is connected at its lower end, through a link 122, with the inner end of a rocker frame 123 that is fulcrumed at 124 to a bracket 125, secured to the upper side of the rail 110. As best shown in Figs. 18 and 19, the rocker frame 123 is made up of side plates 126 that are connected together at their rear ends by a bolt 127, and are spaced apart by a tubular spacer 129 that is carried by said bolt. At their forward ends, said plates are connected together and spaced apart (as best illustrated in Fig. 16) by a U-shaped member 130. A compression spring 132 is interposed between the member 130 and the top of the rail 110 and is held in place by pins 133 that are carried by the rail and by the member 130. The spring 132 tends to elevate the forward end of the rocker frame 123, which action is assisted by the weight of the parts connected to the rear end of the frame. The forward downturned ends 135 of the side plates of the frame depend on opposite sides of the web of the I-beam (whereof the rail 110 is constituted), the top opposed flanges of said beam being cut away adjacent the forward end of the rail to accommodate said down-turned ends. Said ends are adapted to be projected between the rollers 136 of the trolley 112 to secure the trolley against movement along the rail. The rail 110 is sustained in its lowest position by a bail 138 that hangs from the member 103.

Swung by means of a clevis 140 from the trolley 112 is a cross beam 141 which has notches 142 formed in its upper side adjacent its ends (see Fig. 17). Reposing within these notches are so-called knife edge bearings 143 that are incorporated in vibrator structures 144. These structures involve pressure fluid actuated vibrating devices of standard construction, and the supply of pressure fluid thereto and to the motor 115 above referred to is controlled by valves 145 and 146 that are supported on a bracket 147 suspended from the upper frame structure, suitable conduits, omitted to avoid confusion of lines, leading the pressure fluid past said valves to the motor and vibrators. Bails 150 are secured to and hang from the vibrator structures 144 and at their lower ends are forked, and the branches of the forks terminate in hooks 151. Handles 152 and 153 project from the opposite sides of the bails 150. The purpose of these handles is to provide means for swinging the bails 150 away from each other against the action springs 154 which tend to swing the lower ends of the bails inwardly. These springs are supported upon studs 155 that depend from the beam 141 and are threaded at their lower ends for the application of nuts 156, the upper ends of the springs bearing upon angle brackets 157 that are secured to the inner sides of the vibrator structures 144.

As will appear from a later description of the operation of the system, the molds are delivered to the shake-out apparatus by the mold carriers, and it is essential that the carriers be positioned directly in line with the rails 110 when the molds or flasks are transferred from the carriers to the vibrating apparatus and vice versa. To so position a mold carrier with respect to the vibrating apparatus I employ a positioning fork illustrated in detail in Fig. 14, and shown, as well, in Figs. 13 and 15. At the left hand end of station C, as it is viewed in Fig. 1ᵃ, I support the positioning fork from an angle bar 160 that is sustained by and between the corresponding posts 100, while with respect to the other units, the positioning forks are carried by the shafts 106. Between angle brackets 161 that are applied to the angle bar 160 is pivotally supported, as on a cross pin 162, the inner end of a fork 163 that is designed to embrace the column 71 of a mold carrier. The fork 163 is shown as a built-up structure comprised of side plates that are connected together and spaced apart by cross members 164. The fork is adapted to be swung from effective position, wherein it is sustained by a stop 165 (Fig. 13), to ineffective position, wherein it is held by a second stop 166 (Fig. 15), by means of a handle 167. In the other instances referred to, the forks are fulcrumed directly on the shafts 106.

*Means for separating castings from sand*

Below the openings 105 are screens 170 which, when the sand and castings are precipitated thereon, serve to separate the castings from the sand, the castings passing down a chute 171 into a suitable receiving receptacle 172 while the sand drops through a hopper 173 onto an endless apron conveyor 174 which discharges onto a similar conveyor 175 that is arranged at right angles to the former conveyor and dumps onto the lower flight or branch 2ᵇ of the previously mentioned conveyor 2 and by which it is conducted to the re-conditioning apparatus 1.

*Operation*

It will be noted that there is a transverse branch of the track 10 for each of the molding machines 3. Describing the operation of the system it may be explained that, in starting, an empty mold carrier is brought onto the branch track of the particular machine which is under consideration and positioned in front of the corresponding back-stop 11. The back-stop prevents the carrier from swinging while the operator is placing the molds thereon. This present carrier will, for the purpose of description, be referred to as the receiving carrier. A second carrier, brought from the shake-out station C and loaded with a stack of empty flasks, is moved onto the transverse track alongside the receiving carrier and, for the purpose of description, this second carrier will be referred to as the supply carrier. The operator, standing in front of the molding machine, lifts an empty flask from the supply carrier, places it in the machine, operates the gate 7 of the chute 6 to discharge a quantity of sand into the flask, scrapes off the surplus sand which falls onto the floor, later to be scraped through the adjacent opening 5, and operates the machine, which forms the mold. The flask containing the mold is then lifted from the machine and placed upon the receiving carrier and the operator takes another empty flask from the supply carrier, repeats the former operation, and places the newly formed mold on top of the one previously placed upon the receiving carrier, the flasks being so designed, with their dowels 48 and dowel openings 49, as to insure their proper relative position on the carrier. If any cores are to be placed within the molds, a core placer inserts them while the operator is making the next mold. When all the flasks have been removed from the supply carrier and filled and placed upon the receiving carrier, the latter carrier is shoved along the track and the empty, so-called supply carrier, is brought up in front of the back-stop 11, the same now becoming the receiving carrier, and another carrier with a stack of empty flasks is moved up alongside the present receiving carrier and assumes the rôle of supply carrier. The former receiving carrier, laden with its molds, is moved on through the corresponding switch 10ᵇ and along the subsequent track section, past switch 10ᶜ, onto one of the branches of the track alongside the pouring platform 15. Unless the mold carrier happens to be in correct position to present the sides of the molds that are unobstructed by the columns 71 to the pouring platform, the latch bolt 88 is released and the carrier is rotated through 180°. As the carrier enters the pouring station, a mold weight is, in accordance to common practice, placed upon the top mold of the stack for the purpose of keeping the molds compressed during the pouring operation. The carrier is then moved forwardly to a convenient position adjacent the back-stop 35, which back-stop prevents the carrier from swinging while the molds are being poured.

Each of the portable ladles 30 is manned by an operator that brings the ladle into proper position with respect to the molds and pours the molds, after which he moves his ladle through the switch 19 onto the central track 16, swinging the switch as he enters the latter track so that it will be in position for the next operator, it being explained that the operators on the opposite sides of the platform alternate in entering the central track 16. The operator, in his turn, moves his empty ladle from track 16 onto one or the other of the track sections 20 or 21 of the shuttle truck 22 according to the track section which is in register at the time with the central track 16. In running the ladle onto the track section of the truck it is brought into a position to receive a supply of molten metal from the master ladle 27. An operator having charge of the master ladle pours the required quantity of metal into the portable ladle, and another operator, assigned to the management of the shuttle truck 22, moves the truck across the track 23 to bring the track section of the truck which bears the filled ladle into register with one of the outer tracks. This moves the other track section of the truck into register with the central track 16 so that the next empty ladle may be brought into receiving position with respect to the master ladle.

Any gas generated within and escaping from the molds after they have been poured is immediately ignited by the flames from the burners 37 and is thus consumed so as to avoid its accumulation and explosion, as well as to prevent it from bringing injury or discomfort to the workmen. As the carriers leave the pouring station the weights are removed therefrom and placed upon the conveyors 36 which return them to the locations in which they are placed upon the molds prior to the pouring.

The carriers are propelled along the track from the pouring station, past the switch 10$^d$, and thence to one of the shake-out apparatus of station C. Any carriers arriving at the shake-out station in incorrect angular position with respect to the shake-out apparatus, are unlatched and turned through 180°, as explained in connection with the pouring station.

The carrier containing the flasks from which the sand and castings are to be discharged is brought into a position opposite the rail 110 of the apparatus selected, and the positioning fork 163 is swung down to embrace the column 71 of the carrier. It will be understood that at the time the carrier is brought into this position, the trolley 112 is in its rearmost position, against the stop 114. An operator, standing in front of the carrier, grasps the handles 152 of the bails 150 and separates the bails in opposition to the action of springs 154 and pushes the structure forwardly until the movement of the trolley is arrested by the stop 113. He then releases his hold on the handles 152 which allows the springs 154 to swing the bails toward each other and project their hooks 151 beneath the sockets 53 of the bottom flask. The inwardly diverging guide walls 81 on the flask support 75, and the stop lugs 82, serve to properly position the hooks 151 with respect to the sockets 53. The operator then opens the appropriate one of the valves 145 and 146 to admit pressure fluid to the cylinder of motor 115, thereby to rock the frame 123 and project its forward ends 135 between the wheels of the trolley 112, locking the trolley in its outermost position, the same action of the motor, through the intervention of the frame 123, lifting the outer end of the rail 110. This results in the molds being lifted from the mold support of the carrier so that the carrier, after the positioning fork 163 has been swung upwardly out of the way, may be shoved to one side thereby to remove the mold support from beneath the suspended molds. The operator then opens the other of the aforesaid valves which permits the passage of motive fluid to the vibrating devices incorporated in the structures 144 from which the bails 150 are suspended, causing the molds to be jarred vigorously enough to dislodge the sand and castings therefrom so that the sand and castings from all of the flasks are precipitated through the opening 105 onto the screen 170 therebelow, the castings being thus separated from the sand and discharged into the receptacle 172 while the sand, dropping through the hopper 173 onto the apron conveyor 174 is returned by said conveyor and the conveyors 175 and 2 to the sand reconditioning apparatus 1.

Referring again to the mold carrier, attention is called to the loose connection between the head 70 and the beam 60 effected through the enlarged eye of the king bolt 69 and the bolt 67 from which it is supported. This allows the suspended structure to swing freely with respect to the trolley structure, relieving the parts of any strains which would otherwise be imposed upon them and insuring easy operation of the trolleys along the track. When the suspended structure swings generally in the plane of the latch bolt 88, said latch bolt rocks on its pivot; and the notches 98 in the latch ring are sufficiently wide to prevent cramping or twisting of the latch bolt when the structure swings generally in a direction at right angles to the aforesaid plane.

It may be explained, also, that the purpose of the guide strip 84 is to facilitate entering the dowel pins of one flask into the dowel pin openings of another as the flasks are stacked one upon another on the mold support.

Having thus described my invention, what I claim is:

1. In foundry apparatus associated with molding, pouring and shake-out stations, an endless carrier track, a plurality of mold support carriers adapted to run on said track, side tracks shunting said track and switches for selectively directing said carriers to and from said tracks and said side tracks whereby some of said mold carriers can be shunted around other carriers and delay at one point of the system will not impede the whole system.

2. Foundry apparatus associated with molding, pouring and shake-out stations comprising a branched endless carrier track, branches of said track being on each side of at least one of said stations, a plurality of mold carriers on said track, means to selectively direct the carriers onto any one of said branches, and means for varying the position of the mold carrier in accordance with the branch of the track on which it is directed.

3. Foundry apparatus associated with molding, pouring and shake-out stations comprising an endless track, a plurality of mold carriers on said track, side tracks adjacent a plurality of said stations, the number of side tracks being proportional to the time required for the retention of the mold carrier at each station, switches for selectively directing said carriers to and from said side tracks whereby the apparatus may be continuously operated as a unit without lost time.

4. In foundry apparatus wherein a conveyor interconnects molding station, pouring station and shake-out station, a track passing said stations and branching at said pouring station so as to pass on both sides thereof, branches merging beyond the pouring station to form a single track leading to the shake-out station, and mold carriers rotatably supported on the track whereby they may be properly positioned with respect to said stations.

In testimony whereof, I hereunto affix my signature.

FRANK E. McCABE.